March 17, 1936.  A. T. COLWELL ET AL  2,034,227
SEAL FOR BEARINGS
Filed Feb. 9, 1934
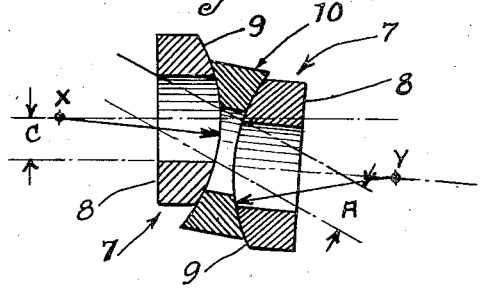
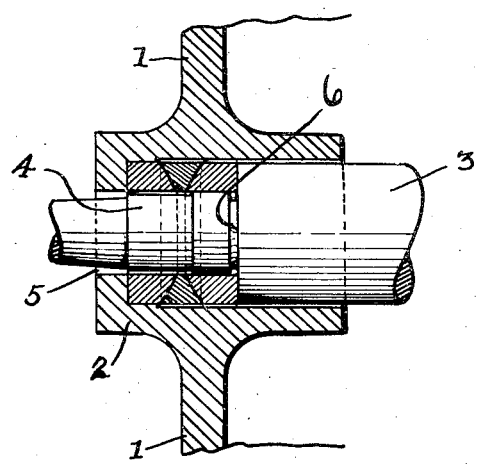
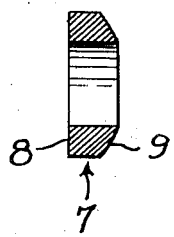 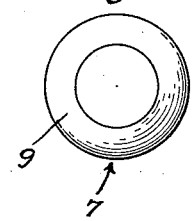 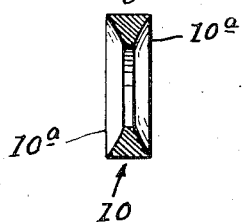
INVENTORS.
ARCHIE T. COLWELL.
ARTHUR TOWNHILL.
BY *Milburn and Milburn*
ATTORNEYS.

Patented Mar. 17, 1936

2,034,227

UNITED STATES PATENT OFFICE 2,034,227

SEAL FOR BEARINGS

Archie T. Colwell and Arthur Townhill, Cleveland, Ohio, assignors to Thompson Products, Inc., Cleveland, Ohio Application February 9, 1934, Serial No. 710,568

3 Claims. (Cl. 308—36.1)

This invention relates to bearing and sealing constructions for rotatable shafts which extend through the walls of compressor casings, water pumps and the like, in which there are different degrees of pressure upon the two sides of the casing wall and in which it is desirable to maintain a hermetic seal at the point of the shaft bearing.

As is well known to those who are familiar with this particular art, there is more or less danger of the rotatable shaft being cocked during operation and there is like danger that such cocking of the shaft will cause a binding of the same at the point of the bearing.

Accordingly, one object of the present invention is to devise a bearing and sealing construction in which there is less danger of the rotating shaft binding because of cocking of the same, such improvement to be accomplished by a particular combination of sealing members.

It has also been the practice to lap the sealing members in some forms of joints so as to obtain an effective seal, but this has entailed an increased expenditure of time and labor and hence additional expense.

Another object therefore is to provide a combination of sealing members which are adapted to afford a more efficient and dependable seal and which can be produced and installed in a comparatively simple and less expensive manner.

Other objects will appear from the following description and claims when considered together with the accompanying drawing.

Fig. 1 illustrates the present improved device in assembly in a compressor casing, which together with the rotating shaft is shown only in part;

Fig. 2 illustrates the advantage resulting from the present device with respect to the reduced danger of binding of the shaft;

Fig. 3 is a sectional view of one of the duplicate outer sealing rings;

Fig. 4 is an elevation of one of the sealing rings and indicates their annular form; and Fig. 5 is a sectional view of the middle sealing ring.

Referring to the accompanying drawing, the crank case 1, which is illustrated only in a partial manner, has the recessed bearing portion 2 provided in one wall thereof. This bearing portion is adapted to afford a bearing for the shaft 3 which extends therethrough, the reduced end portion 4 of the shaft projecting through the axially disposed opening 5 in the end of the bearing portion.

The present improved sealing combination is arranged about the reduced shaft portion 4 and is engaged between the end of the bearing portion 2 of the casing and the shoulder 6 which is provided upon the shaft 3. Although not shown in the accompanying drawing, yet it is to be understood that at the other side of the casing, there may be provided a suitable form of means, as for instance a spring, for exerting sufficient pressure longitudinally of the shaft and upon the combination of sealing rings to constantly maintain the same in effective engagement between the shoulder 6 and the end of the bearing portion 2 about the opening 5.

The present improved sealing combination comprises duplicate outer ring members 7 each of which has a plain face 8 and a sphero-convex face 9, these two rings 7 being arranged upon opposite sides of the middle ring member 10, both faces of which are of sphero-concave form, as indicated at 10$^a$.

The rings 7 are formed of hardened steel or other suitable metal, while the middle ring member 10 is formed of soft metal or non-metallic material, such as fibre, bakelite or the like. The inner and outer ring members may have slightly different degrees of curvature upon their convex and concave faces, respectively, so that their contacting faces may be more effectively worked into perfect sealing engagement. By forming the rings of steel and fibre, for instance, respectively, as above explained, any irregularities or imperfections in their interengaging faces, will be relieved and overcome by virtue of the comparatively yieldable nature of the middle ring 10 and there will thus be ensured a complete seal, whether or not the feature of different curvatures just referred to, be employed. This result is obtained without the necessity of lapping the engaging faces of the rings or otherwise perfecting the same as would be necessary in case all of the rings were formed of hardened steel or the like.

The one ring 7 is of such diameter as to be press-fitted in the recess of the bearing portion so as to provide a hermetic seal at this point, while there is a slight clearance between the shaft and this ring. The other ring 7 has a press fit on the reduced portion of the shaft while there is a slight clearance between this ring and the casing wall. The middle ring 10 engages only the two outer rings and is clear of the shaft and casing. This inner ring 10 forms a hermetic seal between the other two rings 7. The rings are held in firm engagement with each other and with the shaft and casing so as to constitute a dependable form of hermetic seal.

In the present illustration, both of the outer rings are shown as being formed separately from the shaft; but instead of press-fitting the one ring upon the shaft, as herein disclosed, this ring may be formed integrally with the shaft. In such modification, the other two rings will be formed and applied in the same manner as herein set forth. The description of the ring as being hermetically secured upon the shaft in the claims is to be understood as covering also the formation of the ring as an integral part of the shaft.

Referring to Fig. 2 of the drawing, the ring members 7 and 10 are shown in a position corresponding to a cocked condition of the shaft 3, this out-of-line condition of the two ring members being exaggerated in Fig. 2 for the purpose of illustration. It will be observed that the center "X" about which the ring member 10 oscillates lies on the left side of the arcuate path thereof, as viewed in this figure of the drawing. Likewise, the center "Y" of oscillation of the one ring member 7 is on the right side of the arcuate path thereof. That is, the center of oscillation in each instance lies on the same side of the adjustable rings as the particular ring member itself, and it will be seen that the arcuate paths of oscillating movement of these ring members come comparatively close together in the region of the axis of the shaft. This is seen from the fact that the middle portion of the middle ring member 10 is of comparatively small dimension axially, due to its double concave form; and consequently the shaft opening through the middle ring member is of comparatively short axial extent. Thus, by virtue of the comparatively short axial extent of the shaft opening through the middle ring member, there results a comparatively little interference by the middle ring member with the shaft through the sealing ring combination, regardless of the displacement of the one ring member 7. As indicated, for instance in Fig. 2, there is still maintained a substantial clearance through the sealing rings, as indicated by the reference characters "A" and "C". This is true because, as above explained, there is comparatively little movement of the middle ring member 10 for a given displacement of the one ring member 7, and the interference of the middle ring member with the proper alignment of the shaft, is practically nil.

From the exaggerated illustration in Fig. 2 of the drawing and the above explanation, it will be seen that for a given degree of cocking of the shaft in the present device there is comparatively little danger of binding of the shaft in the seal combination. As a matter of fact, in actual use of the present improved device, there will be no binding of the shaft on account of any cocking which will actually occur in the normal course of operation. This constitutes an important advantage of real practical value.

The employment of fibre or other comparatively yieldable material for the middle ring member contributes a two-fold advantage; first, an increased efficiency in the sealing effect and second, a possible saving in cost. The difference in the degrees of curvature of the contacting faces of the rings also contributes towards obtaining a perfectly sealed joint between the ring members.

Thus, considering the several advantages above mentioned, this device affords increased efficiency at reduced cost, as compared with prior devices.

What I claim is:

1. A bearing and seal construction comprising a rotatable shaft and a casing therefor, a ring hermetically secured to the shaft casing with clearance between said ring and the shaft and having on one side a sphero-convex surface, a second bearing ring of double sphero-concave form, one face of which engages the convex surface of the first-mentioned ring to form a spherical bearing and sealing joint therebetween there being clearance between said second ring and the shaft and the casing, and a third ring having a sphero-convex face engaging the other sphero-concave face of the second ring so as to form a spherical bearing and sealing joint therebetween, said third ring being hermetically secured upon the shaft with clearance between said third ring and the casing, whereby there is obtained a hermetic seal for the bearing connection and the danger of binding otherwise caused by cocking of the shaft is eliminated.

2. A bearing and seal construction comprising a rotatable shaft and a casing therefor, a ring of hard metal hermetically secured to the shaft casing with clearance between said ring and the shaft and having on one side a sphero-convex surface, a second bearing ring of double sphero-concave form and of comparatively soft material, one face of which engages the convex surface of the first-mentioned ring to form a spherical bearing and sealing joint therebetween there being clearance between said second ring and the shaft and the casing, and a third ring of hard metal having a sphero-convex face engaging the other sphero-concave face of the second ring so as to form a spherical bearing and sealing joint therebetween, said third ring being hermetically secured upon the shaft with clearance between said third ring and the casing, whereby there is obtained a hermetic seal for the bearing connection and the danger of binding otherwise caused by cocking of the shaft is eliminated.

3. A bearing and seal construction comprising a rotatable shaft and a casing therefor, a ring hermetically secured to the shaft casing with clearance between said ring and the shaft and having on one side a sphero-convex surface, a second bearing ring of double sphero-concave form, one face of which engages the convex surface of the first-mentioned ring to form a spherical bearing and sealing joint therebetween there being clearance between said second ring and the shaft and the casing, and a third ring having a sphero-convex face engaging the other sphero-concave face of the second ring so as to form a spherical bearing and sealing joint therebetween, said third ring being hermetically secured upon the shaft with clearance between said third ring and the casing, whereby there is obtained a hermetic seal for the bearing connection and the danger of binding otherwise caused by cocking of the shaft is eliminated, the sphero-contact faces in each instance between the inner and outer ring members being formed with slightly different degrees of curvature.

ARCHIE T. COLWELL.
ARTHUR TOWNHILL.